(No Model.)　　　　　　　　　　　　　　　　　　3 Sheets—Sheet 1.
J. A. WETMORE.
PROPELLING CARS BY GAS MOTORS.
No. 348,080.　　　　　　　　　Patented Aug. 24, 1886.
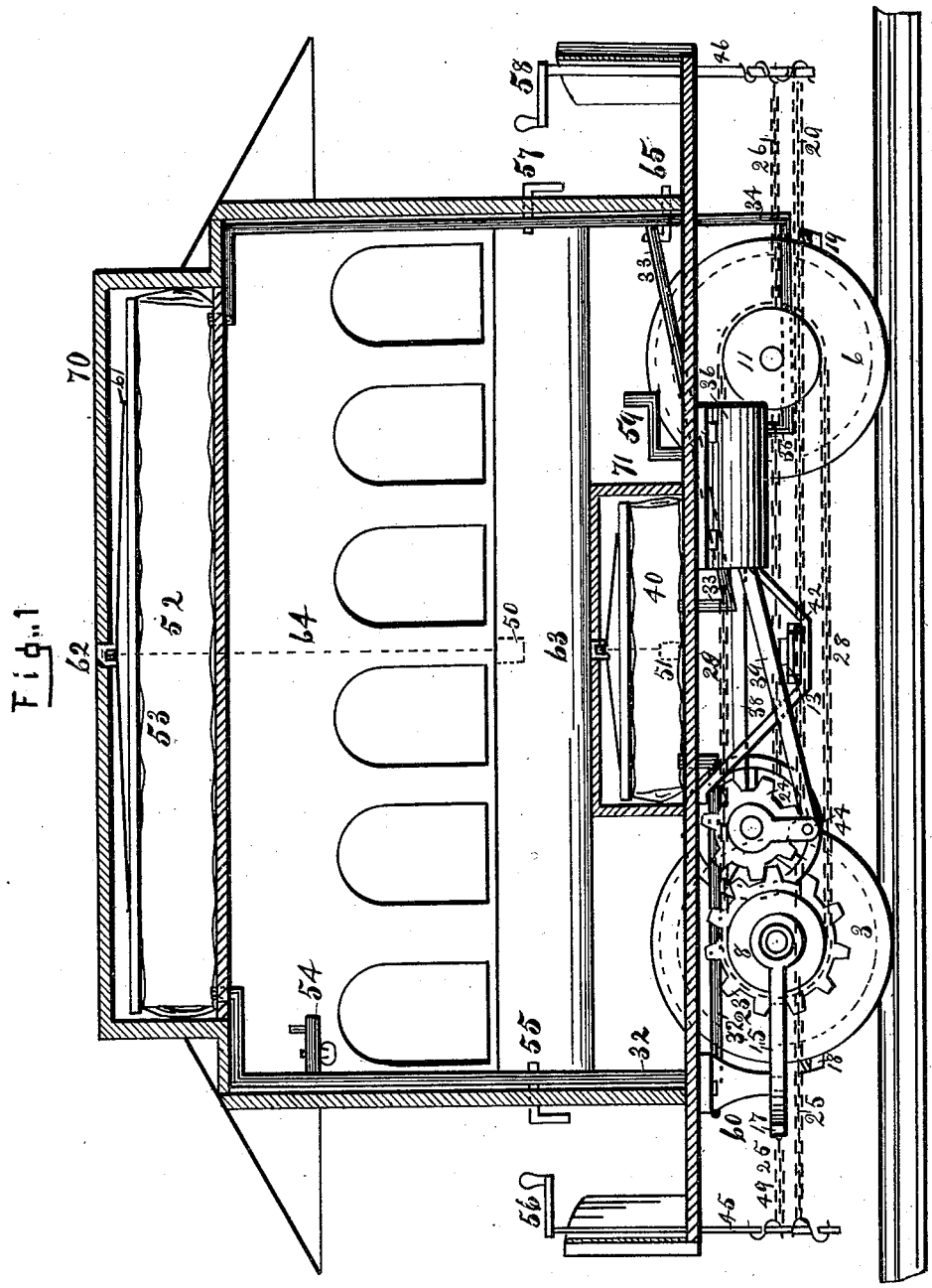

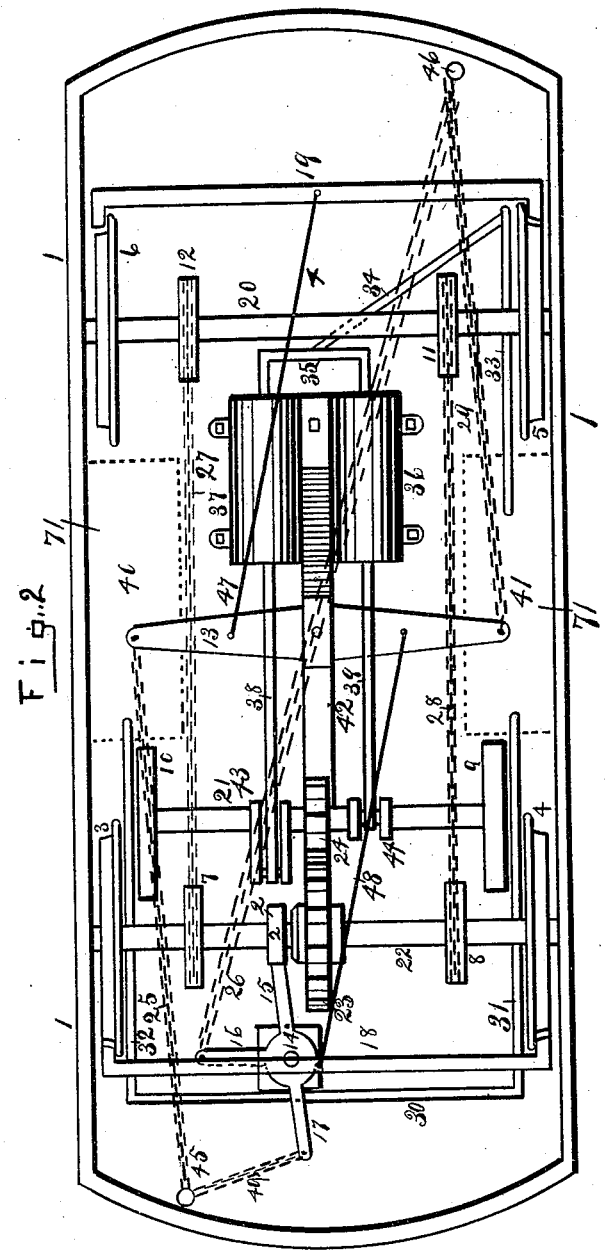

(No Model.)
3 Sheets—Sheet 3.
J. A. WETMORE.
PROPELLING CARS BY GAS MOTORS.
No. 348,080. Patented Aug. 24, 1886.
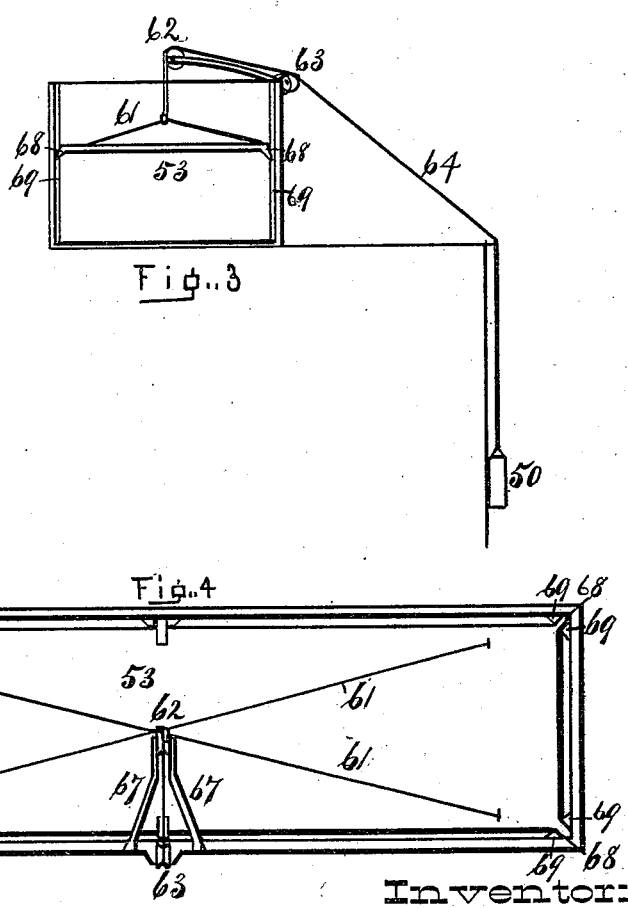

United States Patent Office.

JEAN A. WETMORE, OF BROOKLYN, NEW YORK.

PROPELLING CARS BY GAS-MOTORS.

SPECIFICATION forming part of Letters Patent No. 348,080, dated August 24, 1886.

Application filed March 19, 1885. Renewed July 10, 1886. Serial No. 207,717. (No model.)

*To all whom it may concern:*

Be it known that I, JEAN A. WETMORE, of Brooklyn, in the county of Kings and State of New York, have invented a new and useful Improvement in Propelling Cars by Gas-Motors, of which the following is a specification.

My invention consists in certain improvements, hereinafter pointed out in the claims, whereby I am enabled to practically apply gas-engines to the propulsion of cars.

Figure 1 is a vertical section through a car with my invention attached. Fig. 2 is a bottom plan view. Figs. 3 and 4 are respectively a section and plan view of one of the gas-reservoirs.

The drawings show my invention attached to an ordinary car, four-wheeled, having a seat on each side running the full length thereof.

1 represents the frame of the car.

3 4 5 6 represent the wheels secured to the axles 22 20, which are journaled in the usual manner.

36 37 represent two gas-engines, of any known type, secured to the frame of the car under the floor.

38 39 represent pitmen, which connect the pistons of said gas-engines with two cranks, 43 44, formed in a crank-shaft, 21, journaled in boxes secured in the frame, and carrying one or more fly-wheels, 9 10, rigidly secured thereto. When two gas-engines are used, the cranks 43 44 should be set at right angles with each other.

24 represents a pinion rigidly secured to crank-shaft 21, and meshes with a gear-wheel, 23, loosely set on axle 22, but held in place thereon, so that it cannot move laterally on said axle, by collars secured to said axle on either side of the hub of gear-wheel 23.

2 represents a friction-clutch, of any known form, secured to and sliding on axle 22, and adapted, when forced against wheel 23, to lock said wheel to said axle, so that said wheel and axle will revolve together.

7 8 represent two chain-wheels, of any known form, rigidly secured to axle 22, and 11 12 represent similar chain-wheels secured to axle 20, wheels 7 12 and 8 11 being connected by endless chains 27 28, so that when axle 22 revolves its motion is communicated to axle 20.

16 17 represent two arms of a bell-crank lever, pivoted at 14 to a plate secured to the under side of the frame of the car, and having secured thereto a third arm, 15, which is connected with the friction-clutch 2, so that by means of said bell-crank lever said friction-clutch can be forced toward or away from gear-wheel 23. Arm 17 is connected by a chain, 49, with the rod 45 of an ordinary brake-windlass, 56, at one end of the car, and arm 16 is connected by a chain, 26, with the rod 46 of a similar brake-windlass, 58, at the other end of the car.

13 represents a brake-lever, pivoted at its center to a frame, 42, secured to the under side of the car, and its ends are connected with the brake-windlass rods 45 46 by chains 25 29.

47 48 represent rods, which connect the brake-lever 13, in the usual manner, with pivoted brake-beams 19 18, hung in the ordinary manner, and carrying ordinary brake-shoes. Chains 49 25 are wound around windlass-rod 45 in opposite directions, and chains 26 29 are similarly wound around rod 46, so that when either windlass is turned so as to apply the brakes the chain which connects such windlass with the bell-crank lever is slackened and the friction-clutch 2 allowed to relax its hold on gear-wheel 23, and vice versa.

70 represents a gas-holder in the roof of the car, and 71 71 represent similar gas-holders under each seat. All these gas-holders are alike, and can be readily understood from a description of one, though numbered differently. As the gas-holder at the top of the car is shown in Figs. 1, 3, and 4, I will describe that. It consists of a wooden box, 70, in which is contained a bag, 52, made of any flexible gas-proof material—such as rubber-cloth—and on the top of this bag rests a weight, 53, to expel the gas from the bag under pressure.

69 69 represent vertical cleats secured to the inside of box 70, at each side of each corner, thus forming a vertical groove at each corner of the box, into which fit guides 68, one of which projects from each corner of weight 53, which guide the weight 53 as it rises and falls and prevents the weight from falling against the side of the box and jamming the bag between the sides of the box and the edge of the weight.

67 67 represent two arms secured to the side of box 70, and project over the center of the box.

62 represents a small block hung on the ends of arms 67, and 63 represents a similar block on the side of the box.

64 represents a cord or chain running over blocks 62 63, and having one end fastened to the center of a bridle, 61, fastened to weight 53, and having at its other end a counter-weight, 50, playing in a box in the side of the car. This arrangement not only counterbalances weight 53, but causes said weight to rise and fall without tilting.

32 33 represent pipes to convey gas from bag 52 to the gas-engine, or one of them, 32, may lead to the lower bags, 40, under each seat. These pipes are provided with shut-off keys 55 57, and in one or both of them may be placed an ordinary gas-burner, 54, to light the car. The two lower gas-bags are connected with pipe 34, at a point below key 57, by pipes 33, in each of which is a key, 65, so that gas may be fed to the engine at will from any one or more of the gas-bags.

30 31 represent pipes by which pipe 32 is connected with both of the lower gas bags.

35 represents a double pipe connected to pipe 34, to feed two engines, and is unnecessary when only one engine is used.

59 represents the exhaust-pipe of the gas-engine, and may lead directly into the open air, or may be connected with a coil of pipe or a drum under the seat of the car, in which case the exhaust will warm the car.

The gas-bags can be filled by connecting either of the pipes 30, 31, or 32 with any source of supply and opening all the keys therein, and the weights and counter-weights can be adjusted to give any desired degree of pressure.

The construction and operation of a gas-engine are so well understood that no detailed description thereof is necessary.

To start the car either brake-windlass is wound up, so as to set the brakes, and the gas-engine set in motion. The engine sets the crank-shaft 21, fly-wheels 9 10, pinion 24, and gear-wheel 23 in motion, but does not affect axle 22, because the friction-clutch 2 is not forced against wheel 23. By releasing the brakes and winding the windlass—say 56—in the other direction chain 49 is wound on brake-windlass rod 45 and acting on arm 17 swings the bell-crank lever on its pivot, which causes arm 15 to press the friction-clutch 2 firmly against wheel 23, and thus lock said wheel to axle 22, when the power of the engine, plus the energy stored up in the fly-wheels 9 10, is brought to bear on said axle. When the car is to be stopped, windlass 56 is turned so as to set the brakes, and this unwinds chain 49, releases arm 17, and the friction-clutch releases wheel 23. It will be seen that the gas-engine runs continuously, and during the intervals while the car is stopped accumulates in the fly-wheels the extra power necessary to start the car. When windlass 58 is used, it operates through chain 26 and arm 16 in the same manner as above described.

What I claim as my invention, and desire to secure by Letters Patent, is—

1. The combination, with a car having its front and rear axles geared together for transmitting motion from one to the other, of a gas-holder carried by the car, a gas-engine having a piston and pitman, a crank-shaft connected with the pitman and journaled intermediate the same and one of the car-axles, gearing between said crank-shaft and the said axle, a fly-wheel on the crank-shaft, and a clutch for coupling and uncoupling the crank-shaft and the car-axle, substantially as described.

2. In combination with a car, a gas-holder, a gas-engine, a crank-shaft connected with the piston of said gas-engine and carrying a fly-wheel, a pinion fastened on said crank-shaft and meshing into a gear-wheel loosely set on one of the axles, a friction-clutch adapted to lock said gear-wheel to the axle, a bell-crank lever connected with said friction-clutch and with the brake-windlass of the car, whereby the motion of said brake-windlass in setting the brakes releases the clutch, and in releasing the brakes sets the clutch, substantially as shown and described.

JEAN A. WETMORE.

Witnesses:
W. L. CANDEE,
THOMAS F. McGLYNN.